US008817960B2

(12) United States Patent
Hodges et al.

(10) Patent No.: US 8,817,960 B2
(45) Date of Patent: Aug. 26, 2014

(54) AUTOMATED ATTENDANT FOR A PRIVATE TELEPHONE SYSTEM

(71) Applicant: Nvideon, Inc., Atlanta, GA (US)

(72) Inventors: Susan R. W. Hodges, Atlanta, GA (US); Christopher J. M. Hodges, Atlanta, GA (US)

(73) Assignee: Nvideon, Inc., Atlanta, GA (US)

( * ) Notice: Subject to any disclaimer, the term of this patent is extended or adjusted under 35 U.S.C. 154(b) by 0 days.

(21) Appl. No.: 13/674,754

(22) Filed: Nov. 12, 2012

(65) Prior Publication Data

US 2014/0133641 A1 May 15, 2014

(51) Int. Cl.
*H04M 1/56* (2006.01)
*H04M 15/06* (2006.01)
*H04M 1/665* (2006.01)
*H04M 3/42* (2006.01)
*H04M 1/663* (2006.01)
*H04M 3/436* (2006.01)

(52) U.S. Cl.
CPC .......... *H04M 1/665* (2013.01); *H04M 3/42314* (2013.01); *H04M 1/663* (2013.01); *H04M 3/436* (2013.01)
USPC .................................................... 379/142.05

(58) Field of Classification Search
CPC .... H04M 1/663; H04M 3/436; H04M 3/4365
USPC ........................... 379/210.02, 142.05, 142.06
See application file for complete search history.

(56) References Cited

U.S. PATENT DOCUMENTS

| 6,463,137 | B1 * | 10/2002 | Vanjani et al. | 379/114.26 |
| 6,618,473 | B1 | 9/2003 | Davis | |
| 7,957,515 | B1 | 6/2011 | Weiss | |
| 2003/0016801 | A1 * | 1/2003 | Moss et al. | 379/142.01 |
| 2003/0081756 | A1 * | 5/2003 | Chan et al. | 379/243 |
| 2003/0123629 | A1 * | 7/2003 | Hussain et al. | 379/207.02 |
| 2004/0114747 | A1 * | 6/2004 | Trandal et al. | 379/211.02 |
| 2004/0208304 | A1 * | 10/2004 | Miller | 379/210.02 |
| 2009/0052648 | A1 * | 2/2009 | Lankes | 379/210.02 |
| 2010/0158233 | A1 * | 6/2010 | Caceres et al. | 379/207.02 |

* cited by examiner

*Primary Examiner* — Sonia Gay
(74) *Attorney, Agent, or Firm* — Cantor Colburn LLP; Michael J. Mehrman

(57) ABSTRACT

A call management device is connected to one or more internal networks and one or more external networks, and it operates to receive incoming calls or messages from the external networks and make a determination as to whether or not the call is from a qualified source. If the call is from a qualified source, the call is immediately forwarded to a destination device connected to the one or more internal networks, and if the call is from a source that is not qualified, the call is either terminated or the caller is prompted to enter a required response and identification information prior to the call be forwarded to the destination device.

21 Claims, 6 Drawing Sheets

COMMUNICATION NETWORK 100

US 8,817,960 B2

AUTOMATED ATTENDANT FOR A PRIVATE TELEPHONE SYSTEM

FIELD OF THE INVENTION

The present disclosure relates to telephone networks and methods for automatic call handling and caller identification information collection at a private branch exchange.

BACKGROUND

A public switched telephone network (PSTN), cellular or mobile network, or Internetwork generally operate to support a large number of organizations and individuals who subscribe to the services offered by a network service provider. Among other things, such networks support protocols for connecting telephone calls, text messages (SMS) or electronic messages (SMTP) initiated by a source device to a destination device. At some point, marketing professionals discovered that they could inexpensively expose a large number of subscribers to their products or services by employing computer generated call/messaging applications. Unfortunately for the subscribers, most of the calls or messages they receive in this manner from these marketing professionals are unwanted and annoying, and so the subscribers typically employ methods to filter out these unwanted calls.

In the case of computer generated telephone calls or text messages, subscribers with answering machines or with caller ID can "screen" each call to determine whether or not to accept the call. In the case of unwanted electronic messages (so called junk mail), applications are available that allow a subscriber to apply differing degrees of filtering to incoming messages. Regardless of the method used to either screen or filter incoming calls or messages, it is incumbent upon the recipient of the unwanted call or message to take the time to manually examine the source of each call or message, or to listen to a recorded message, in order to determine whether or not they wish to accept or respond to a call.

One solution to the problem of manually screening/checking each telephone call is to apply an automatic call blocker to a telephone line that requires each caller to enter a code to complete their call. Since computer generated calls are not able to enter the requested code, these calls will be dropped and so the subscriber is not annoyed by these calls. Another solution to this problem is to compare caller identification information included in an incoming call with caller identification information stored on a telephone device, and allowing the call to be completed if there is a match or rejecting the call if there is not a match.

BRIEF DESCRIPTION OF THE DRAWINGS

The present invention can be best understood by reading the specification with reference to the following figures, in which.

DETAILED DESCRIPTION

Figure 1:
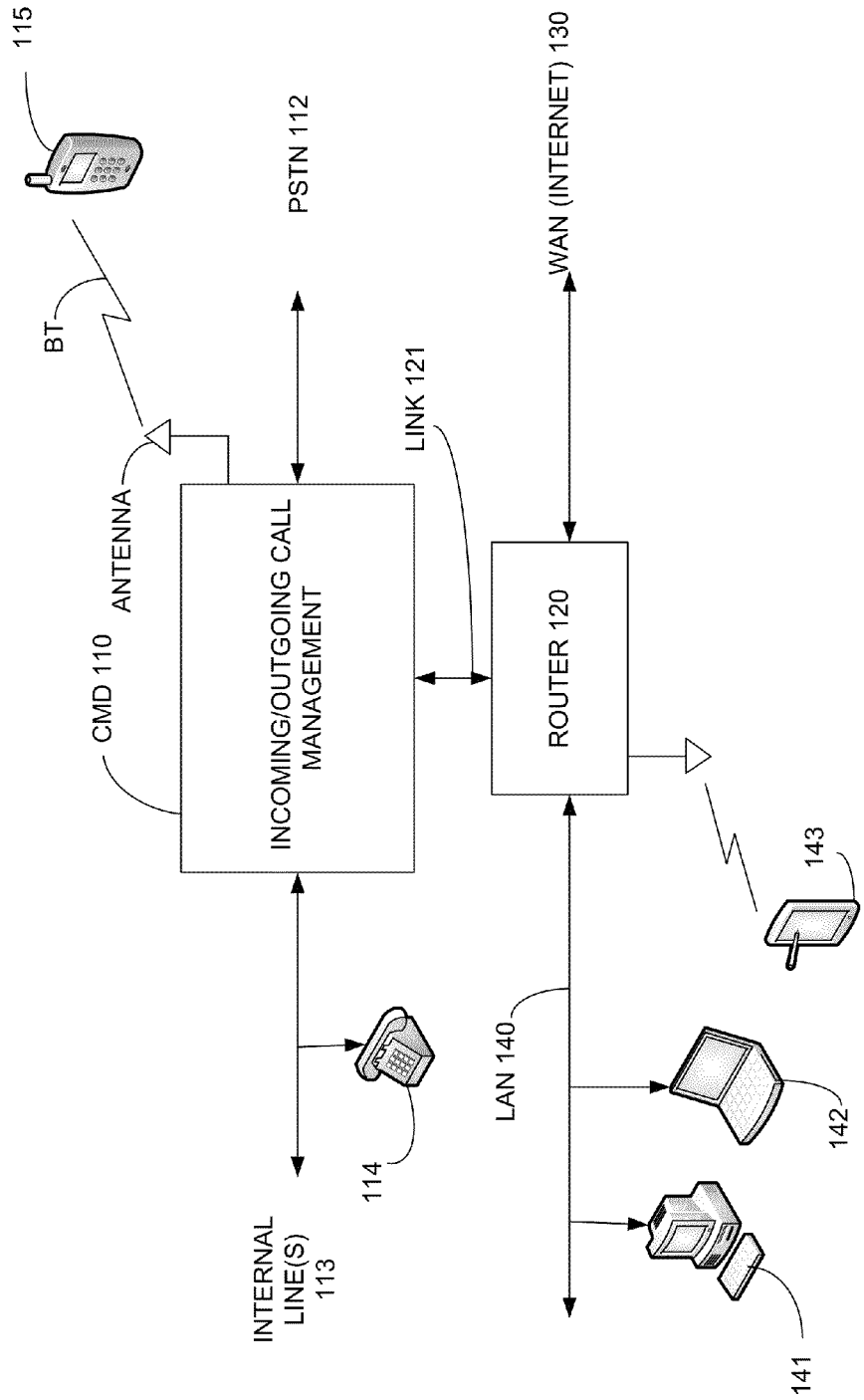
FIG. 1 is a diagram of a communication network 100.

While requiring a caller to enter a code in order to complete a call effectively eliminates annoying marketing and computer generated calls, such call blocking methods may have the unintended consequence of annoying wanted callers, and while rejecting incoming calls in which the identity of the call source does not match the identity of a source in a phone book can eliminate some unwanted calls, this method may have the unintended consequence of eliminating some wanted calls. In this regard, it was discovered that incoming calls from unwanted sources can be rejected, while incoming calls from potentially wanted sources can be allowed if the caller who initiates the incoming call is prompted to enter a required response. If the required response is entered correctly, the call is allowed; otherwise the call is rejected. Further, after entering the required response correctly, the caller at the source of the incoming call is then prompted to enter certain call source identification information which can be stored and used in subsequent comparisons. The next time an incoming call is received from a source for which call source identification information has been previously entered, the call can be accepted without the need for the caller at the source to enter the required response.

In one embodiment, a special purpose or a general purpose computational device is configured to receive an incoming call, and prior to the call being announced by a destination device such as a telephone, determining whether information corresponding to an identity of the source of the call is stored in the computational device, and if it is not, prompting the caller initiating the incoming call to enter a required response, which if entered correctly, causes the computational device to prompt the caller to enter information that uniquely identifies the source of the call and the caller (call source identification information). Subsequent to successfully entering the call source identification information, the incoming call can then be forwarded to a destination device, which can be a telephone or other device capable of handling a telephone call that is attached to the computational device through a local network.

In another embodiment, if the identity of an incoming call source is known to the computational device, and if information stored at the computational device and associated with the call source causes the caller to be prompted to enter a required response, and the required response is entered correctly, the computational device can forward an incoming call to a destination device, without a caller being prompted to enter any information identifying the source of the incoming call.

In another embodiment, if the identity of an incoming call source is known to the computational device, and if information stored at the computational device and associated with the call source does not require the caller to enter a required response the call is then forwarded to a destination device without the caller being prompted to enter the required response or any information identifying the them as the source of the incoming call.

A computational device configured to operate in the manner described above is identified in FIG. 1 as an incoming/outgoing call management device 110 or simply call management device (CMD). The CMD 110 is connected to a public switched telephone network (PSTN) 112 and to one or more private telephone lines 113 each of which is connected to at least one telephone 114. The CMD 110 can also have functionality (Bluetooth radio) that supports the transmission and reception of short range wireless signals to a mobile device 115. A router 120 is connected to the CMD 110 by a link 121, to a wide-area-network (WAN) such as an Internet 130 and to a local network (LAN) 140. The link 121 can be either a serial or parallel bus link and the LAN 140 can operate according to the well known Ethernet protocol. One or more of a personal computer (PC) 141, a laptop computer 142 and a tablet computer 143 can be connected to the LAN 140, and each/all of these devices can be in communication with the CMD 110 via the router 120. It should be understood, that while the functionality comprising the CMD 110 is described here in the context of a single computational device, two or more computational devices can be variously configured with functionality that operates to perform all of the functionality attributed to the CMD 110. The internal lines 113 and LAN 140 are collectively referred to here as an internal network 150, and the PSTN 112, mobile device(s) 115, and the WAN 130 are collectively referred to here as an external network 160.

Figure 2:
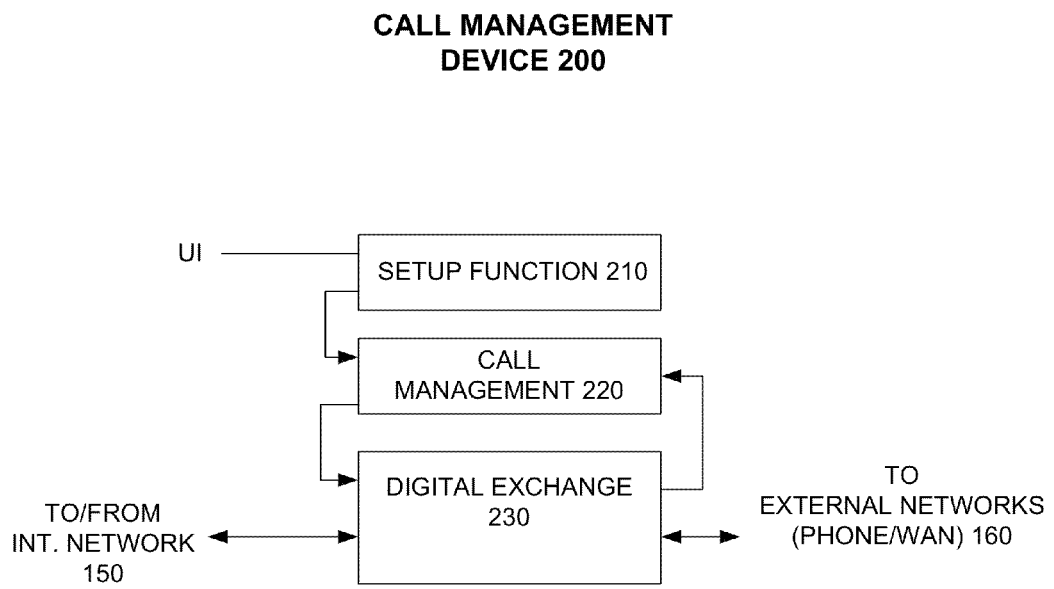
FIG. 2 is a diagram of a call management device 200.

Functional elements comprising the CMD 110 will now be described with reference to FIG. 2. The CMD 110 has functionality 210 that assists a CMD 110 user with certain CMD setup and control features, it has functionality (Call Management Module 220) for providing incoming and outgoing call processing and management, and it has digital switch functionality 230 that operates to forward a qualified incoming telephone call to its proper destination within the internal network 150 and outgoing calls to the external network 160. Specifically, the setup function 210 is employed by a user of the CMD 110 to specify one or more elements comprising call source identification information to be requested from a new source device, it can be employed to configure and to activate the playing of a site information tone (SIT), it can be employed to record certain prompts played to callers, and it can be employed to set logic that operates to reject calls that have caller identification information (CID) blocked or not, to name just a few functions. Caller identification information in this description can be comprised of a phone number, a caller's name or any other information comprising a CID signal in an incoming call. All of the functionality comprising the setup function 210 can be implemented in computer software that is specially designed for the CMD 110 and which can be stored in non-volatile computer memory associated with the CMD.

Figure 3:
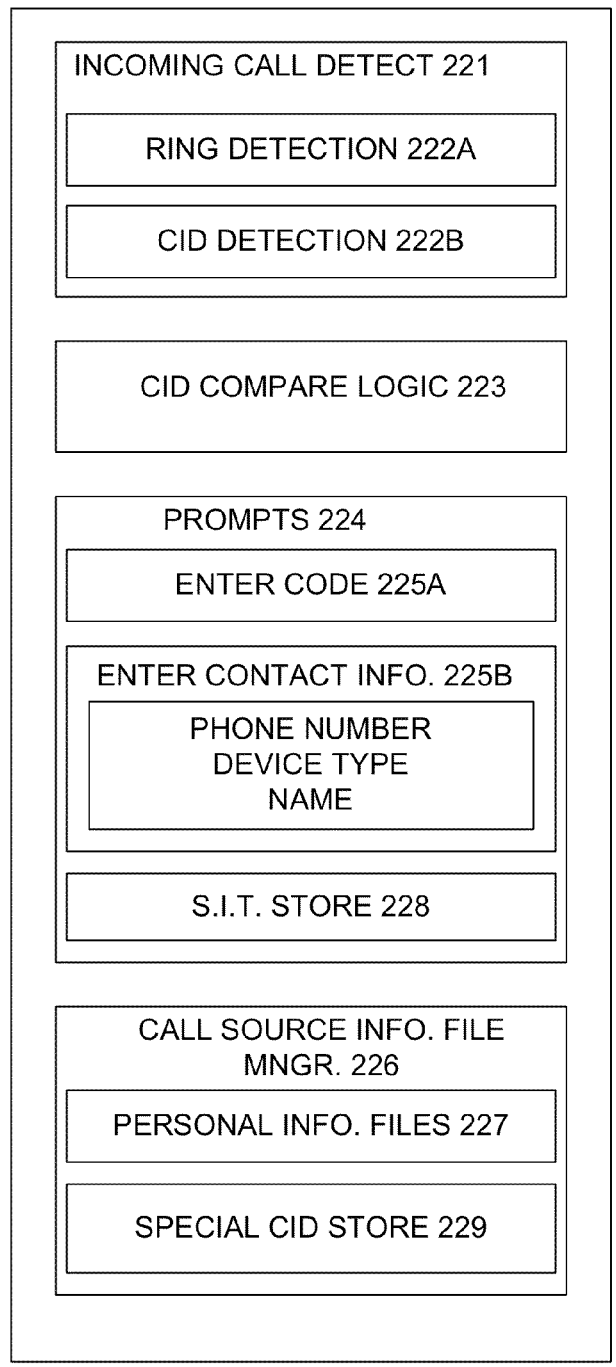
FIG. 3 is a diagram illustrating functional elements comprising a call management module 220.

The call processing and management module 220 shown in FIG. 3 is comprised of functionality implemented in specially designed computer code. Generally, the call management module 220 operates to detect incoming calls and to examine them for CID information, to determine what prompts are played to the caller, to determine whether the calling source is qualified or not qualified, and to manage the reception and storage of call source identification information. More specifically, the call management module 220 is comprised of incoming call detection logic 221, CID comparison logic 223, prompt logic 224, and a call source information file manager 226.

Figure 4:
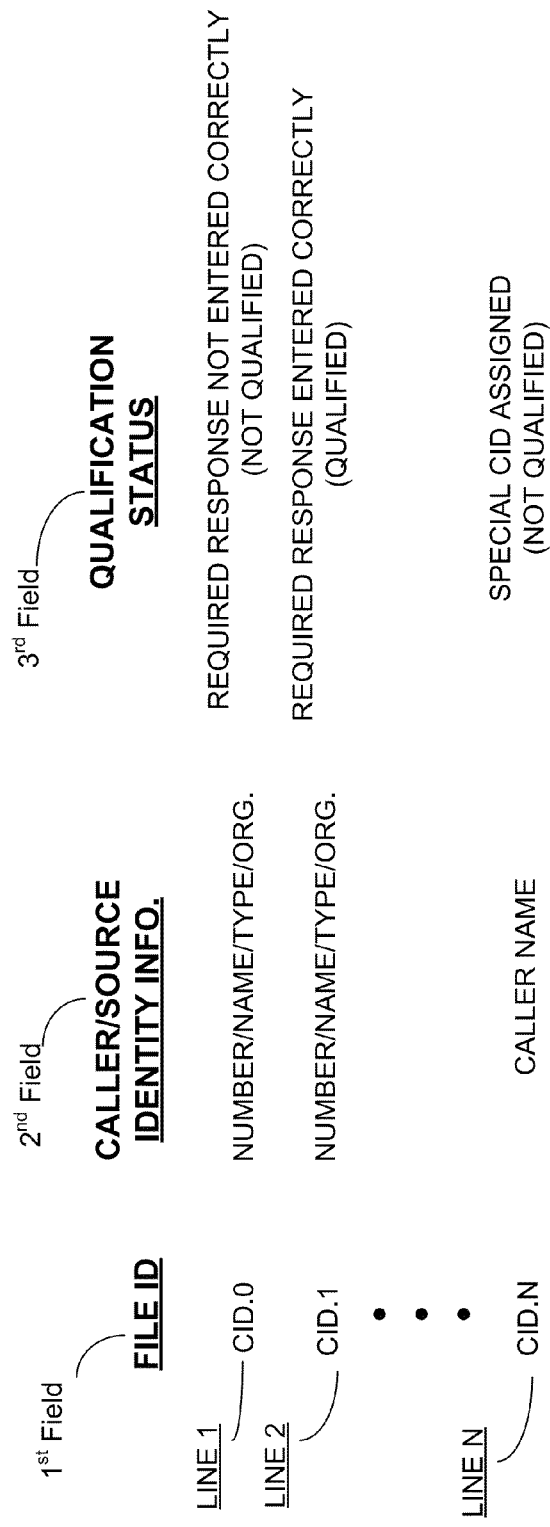
FIG. 4 is a diagram showing a call source information file format 400.

The incoming call detection logic 221 includes a ring detector 222A and a CID detector 222B. The ring detector operates to detect ring signals in an incoming call and the CID detector operates to detect call ID signals in the incoming call. If the logic 221 detects a ring signal, it then looks for information associated with a CID signal, which can be the unique number of a source of the incoming call. The logic 223 compares information comprising the CID signal received from the detection logic 222B to information comprising one or more of a plurality of call source information files 227 compiled by the manager 226. The result of this comparison can be an indication that the source of a call is not a qualified (unqualified) source or is a qualified source. A qualified source is a source communication device for which a call source information file has been created and for which a required response has been entered correctly, or the call source information file was created or modified by a user of the CMD 110. A source communication device that is not qualified is one for which no matching call source information file exists, a caller ID (CID) signal indicates that a call is blocked, the CID signal indicates the caller information is unavailable, no CID signal is detected, or for which a call source information file exists that was not created or modified by a user of the CMD 110, and for which a required response has not been entered correctly. Depending upon the results of this comparison, prompt logic 224 causes one or more prompts to be played to a caller and/or causes a S.I.T. to be played. Prompt 225A is a request that the caller enter a required response (the information need to validated the required response can be stored in memory associated with the prompt logic and be arbitrarily selected/generated or not), a prompt 225B to enter call source identification information such as the type of device they are using to make the call (home phone, work phone, or mobile phone, for instance), and their name. The call source identification information entered in response to the prompt 225B along with the information from 222B is received by the call source information file manager 226 and stored in a file 227 or assigned to a special CID store 229 in the case of blocked, non-existent, or unavailable CID. The file manager 226 can create one or more call source information files 227 for each caller (depending upon the number and type of source devices used by a caller). FIG. 4 illustrates the format in which caller information can be stored in any one of the plurality of call source information files 227.

FIG. 4 illustrates a format which can be used to store call source identification information in any one of the plurality of the call source information files 227. The call source information files 227 can be stored in any type of non-volatile memory associated with the CMD 110 described with reference to FIG. 1. Information comprising each call source information file is illustrated in FIG. 4 as being included in single line, and each file comprises three entries or fields. Each of a first field in the plurality of the call source information file comprises information relating to a unique file identity (File ID), each of a second field in the plurality of the call source information file comprises information identifying the operator or owner of the communication device and the source device initiating an incoming call, referred to here as a unique call source identity (phone number). The source communication device can be, in this case, a mobile phone, a landline phone, a VOIP phone, or some other communication device. Each of a third field comprises information relating to a qualification status of the source communication device. One of two different qualification statuses, qualified and unqualified, can be assigned to each of the plurality of the files 227. The qualification status for each call source information file is determined by the CID compare logic 223 and the qualification status is assigned to each call source information file by the file manager 226. According to one embodiment, a call source is not qualified if a required response is not entered correctly, and a call source is qualified is a required response is entered correctly. The effect that each qualification status has on an incoming call is described with reference to FIGS. 5A and 5B.

Figure 5A:
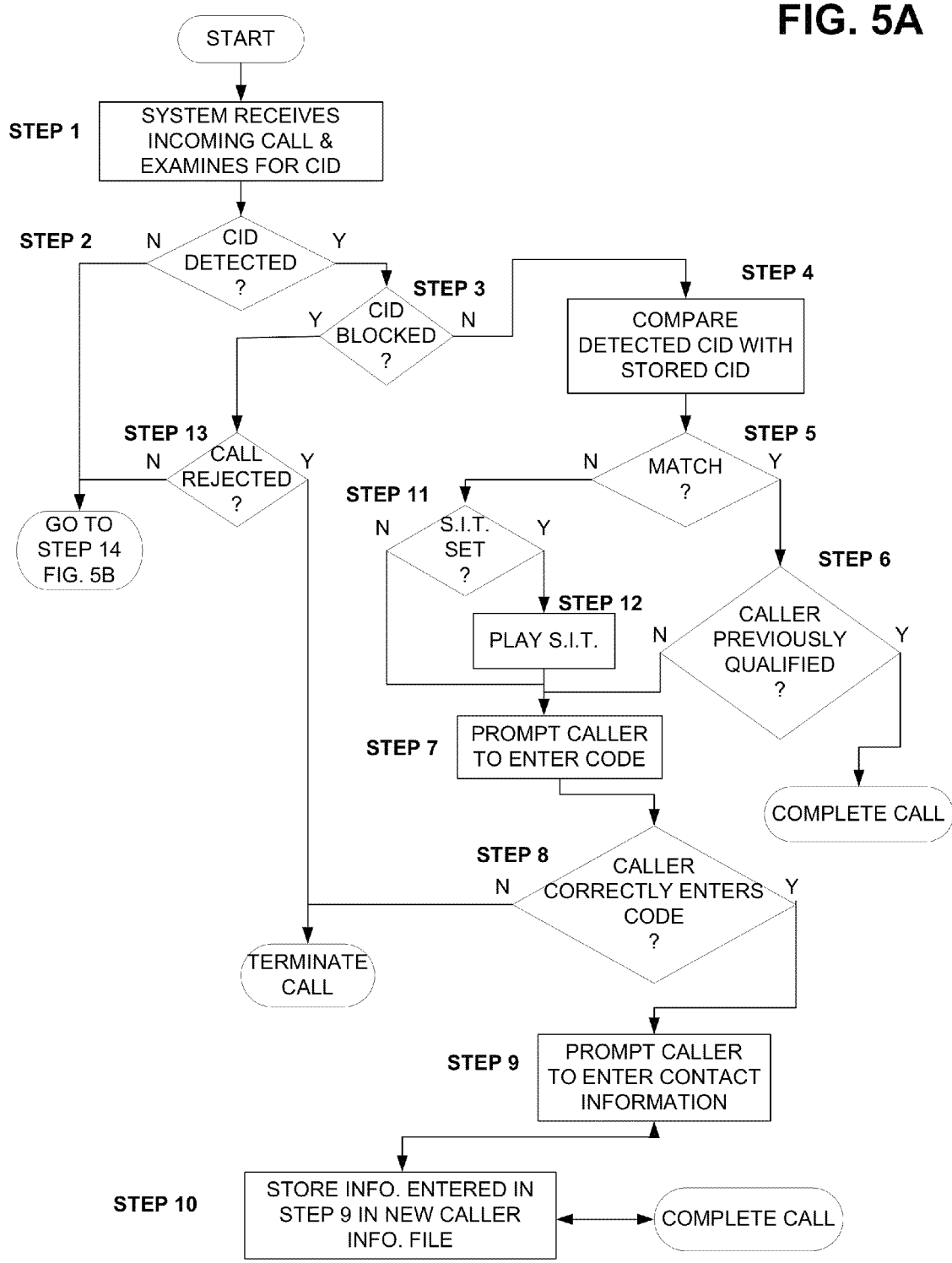
FIG. 5A is a logical flow diagram of an embodiment of the invention.
Figure 5B:
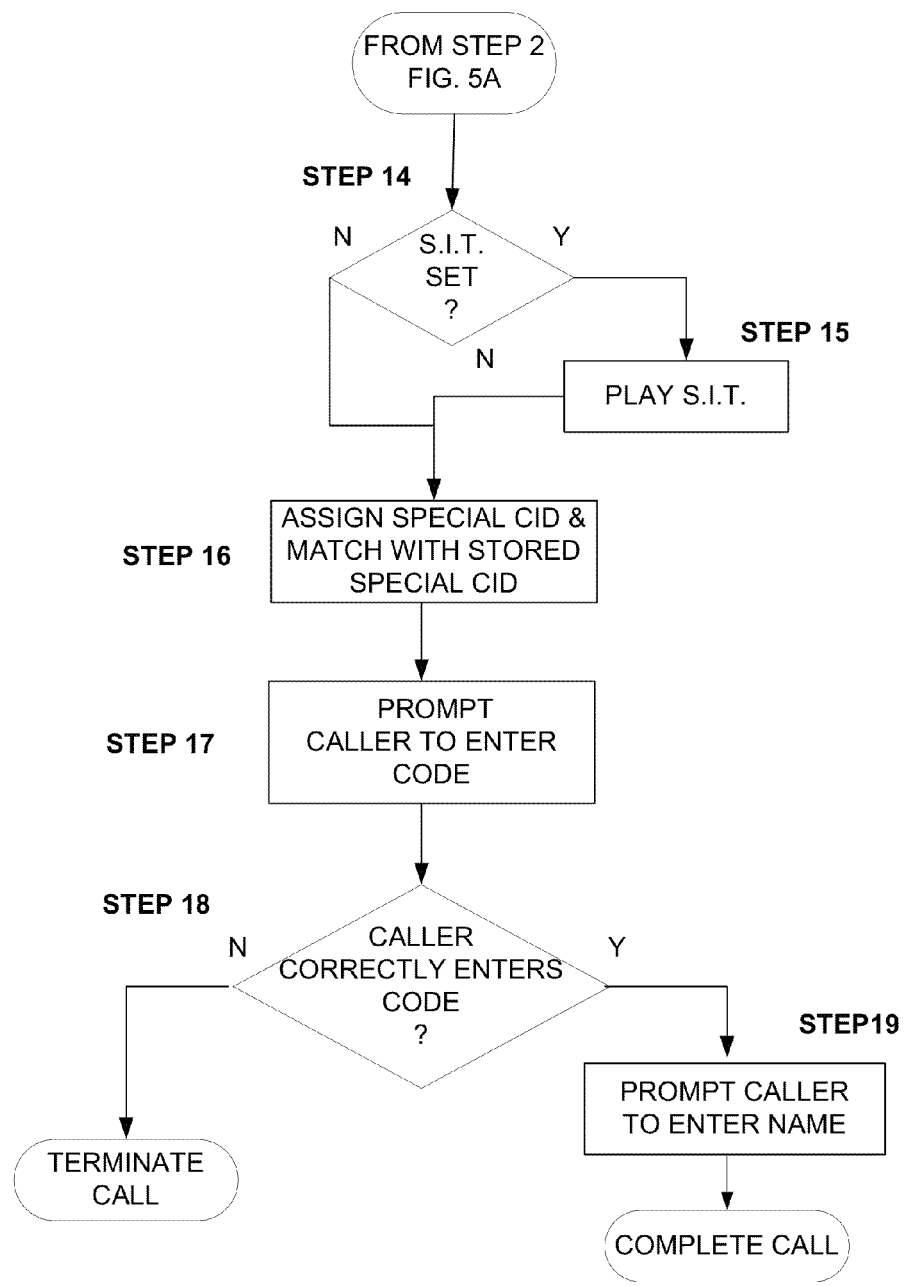
FIG. 5B is a continuation of the logical flow diagram of FIG. 5A.

An embodiment of the process of the invention implemented in the CMD 110 of FIG. 1 is illustrated in FIGS. 5A and 5B and described as follows. The incoming call detector 221 comprising the CMD 110 of FIG. 1 receives, in Step 1, an incoming call from the PSTN 112, Cell Phone 115, or WAN (INTERNET) 130 and in Step 2 either detects or does not detect a CID signal relating to the incoming call. If a CID is detected in Step 2, the process proceeds to Step 3 where the detector 221 determines if the CID is blocked or not, and if the CID is not blocked the process proceeds to Step 4 where the logic 223 compares information detected in the CID with information comprising each of the plurality of call source information files 227 until in Step 5 a matching CID is found or not found. In one embodiment, a unique identifying number (phone number) associated with a source communications device that initiates the call is used in this comparison step. If a match is found, then in Step 6 the logic 223 examines the qualification status in the file associated with the matching CID. If the caller has been previously qualified (assigned the qualified status), then the CMD 110 announces the call to the appropriate destination device and the call is completed, otherwise the process proceeds to Step 7 and the logic 224 is used to prompt the caller to enter a required response at least once into the source device. If in Step 8 the caller enters the required response correctly, the process proceeds to Step 9 and the logic 224 is again used to prompt the caller to enter certain call source identification information which in Step 10 is stored in a call source information file by the manager 226.

Returning to Step 5 in FIG. 5A, if in this step a matching CID is not found, then in Step 11 the logic 223 determines whether a site information tone (S.I.T.) is to be played 228, and if so, the S.I.T. is played to the caller and substantially immediately after the tone is played, the logic 224 in Step 7 plays the prompt 225A which is a request to the caller to enter a required response, at which point the process proceeds as described above.

Returning to Step 3, in the event that the CID is blocked, the process proceeds to Step 13 where the call is either rejected or not rejected based on the CMD 110 user's preference. If the call is not rejected in Step 13, then the process proceeds to Step 14 in FIG. 5B, otherwise the call is terminated. In FIG. 5B Step 14, if the S.I.T. is set to be played then in Step 15 the S.I.T. is played for the caller and in Step 16 a special CID is assigned to the call and matched with a special CID stored in 229. On the other hand, if in Step 14 it is determined that the S.I.T. is not to be played, then the process proceeds directly to Step 16. In Step 17, the caller is prompted to enter a required response, and if in Step 18 it is determined that the required response is entered correctly, the caller is prompted to enter their name or some other call source identification information that can be played by an enunciator (not shown). However, if in Step 18 the caller does not enter the required response correctly, the call is terminated. The required response which the caller is prompted to enter can be any is a combination of one or more alphanumeric characters or one or more a spoken words.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed, obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

We claim:

1. A method for processing an incoming telephone call, comprising:
   receiving an incoming telephone call over a public network from a call source;
   detecting caller identification information associated with the call source in the incoming telephone call;
   comparing the detected caller identification information with qualified caller identification information stored in a memory to determine whether the call source is a qualified call source;
   in response to determining that the call source is not a qualified call source, prompting a caller at the call source to enter a response including a call source type indicating a type of telephone used to place the incoming telephone call;
   receiving a response to the prompt;
   allowing the call if the response corresponds to a required response; and
   terminating the call if the response does not correspond to the required response.

2. The method of claim 1, wherein the required response is comprised of one or more of a numeric code, a letter code, a combination alphanumeric code having one or more characters and one or more spoken words.

3. The method of claim 1, wherein the required response further comprises arbitrarily generated or selected information.

4. The method of claim 1, further comprising prompting the caller to enter a caller name and receiving a name response as a condition to allowing the call when the call source is not qualified.

5. The method of claim 4, further comprising allowing the incoming telephone call only if the caller enters all of the prompted caller name and call source type.

6. The method of claim 1, further comprising allowing the call if the call source is determined to be a qualified call source.

7. The method of claim 1, further comprising playing a site information tone on the incoming telephone call when the call source is not qualified.

8. The method of claim 5, further comprising the next time an incoming call is received from the call source, not requiring the caller to enter a required response prior to allowing the call.

9. The method of claim 1, wherein the type of telephone used to place the incoming telephone call is selected from a list comprising home phone, work phone, or mobile phone.

10. The method of claim 1, further comprising setting the qualification status of the call to be qualified if the caller correctly enters the required response.

11. A method for processing an incoming telephone call, comprising:
    receiving an incoming telephone call over a public network from a call source;
    detecting that a caller identification function in the incoming telephone call is blocked or not present;
    in response to determining that the caller identification function is blocked or not present, prompting a caller at the call source to enter a response comprising an indication of a type of telephone used to place the incoming telephone call;
    receiving a response to the prompt;
    allowing the call if the response corresponds to a required response; and
    terminating the call if the response does not correspond to the required response.

12. The method of claim 11, further comprising prompting the caller to enter a caller name and receiving a name response as a condition to allowing the call.

13. The method of claim 11, wherein the required response further comprises arbitrarily generated or selected information.

14. The method of claim 11, further comprising receiving a selection of the indication of the type of telephone used to place the incoming telephone call from a list comprising home phone, work phone, or mobile phone.

15. The method of claim 11, further comprising playing a site information tone on the incoming telephone call.

16. A method for processing an incoming telephone call, comprising:

receiving an incoming telephone call over a public network from a call source;

determining that a caller identification function in the incoming telephone call is blocked, determining that caller identification information is not present, or detecting caller identification information in the incoming telephone call associated with the call source;

if the caller identification function is not blocked and caller identification information is present, comparing the detected caller identification information with qualified caller identification information stored in a memory to determine whether the call source is a qualified call source;

in response to determining that the caller identification function in the incoming telephone call is blocked, that caller identification information is not present, or that the call source is not a qualified call source, prompting a caller at the call source to enter a response comprising an indication of a type of telephone used to place the incoming telephone call;

receiving a response to the prompt;

allowing the call if the response corresponds to a required response; and terminating the call if the response does not correspond to the required response.

17. The method of claim 16, further comprising playing a site information tone on the incoming telephone call when the call source is not qualified, caller identification information is not present, or caller identification function is blocked.

18. The method of claim 16, further comprising prompting the caller to enter a caller name and receiving a name response as a condition to allowing the call when the call source is not qualified.

19. The method of claim 16, wherein the required response further comprises arbitrarily generated or selected information.

20. The method of claim 16, further comprising setting the qualification status of the call source to be qualified if the caller identification function is not blocked, caller identification information is present, and the caller correctly enters the required response.

21. The method of claim 16, further comprising receiving a selection of the indication of the type of telephone used to place the incoming telephone call from a list comprising home phone, work phone, or mobile phone.

\* \* \* \* \*